United States Patent Office 3,269,188
Patented August 30, 1966

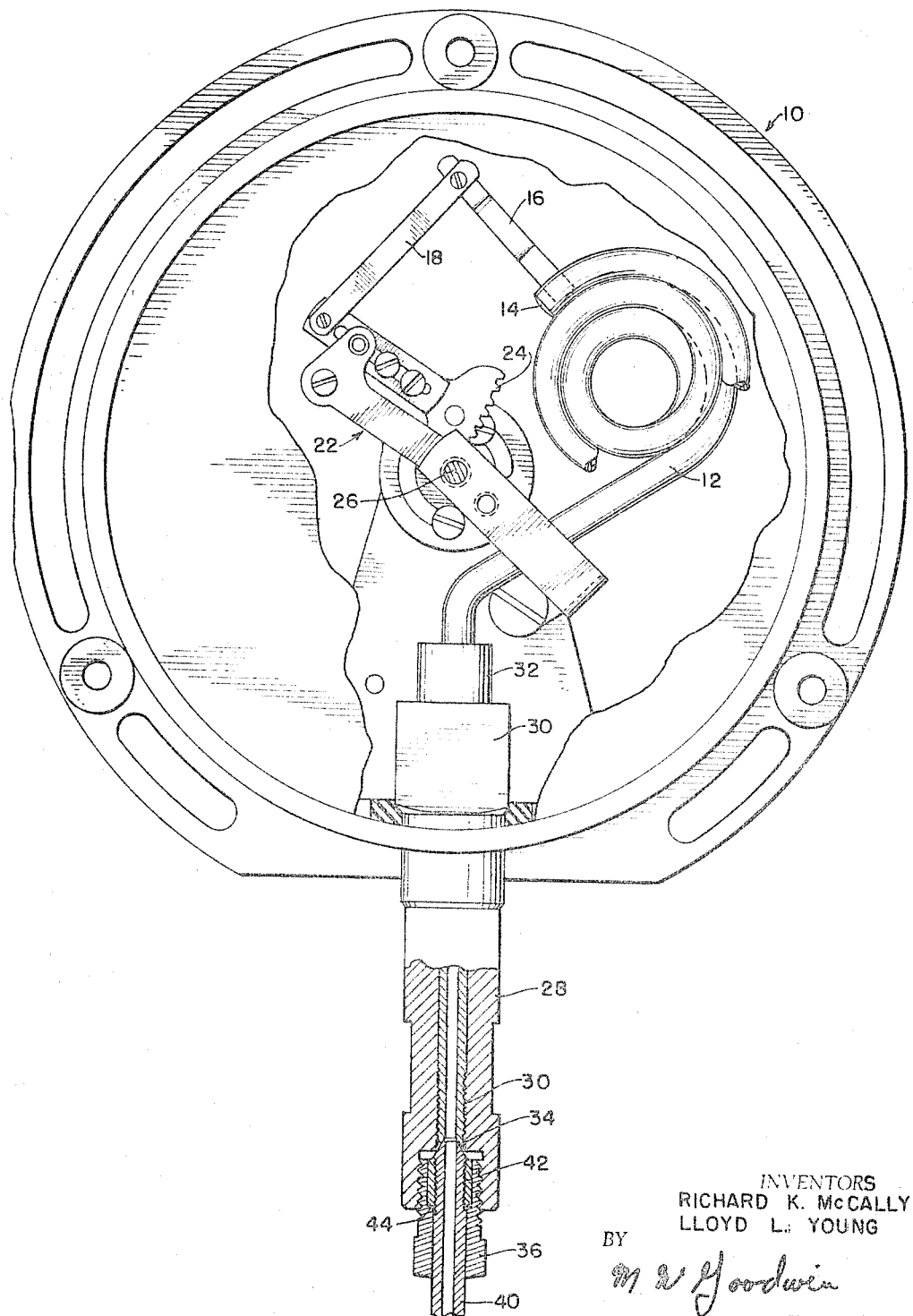

3,269,188
PRESSURE RESPONSIVE DEVICE
Richard K. McCally, Fairfield, and Lloyd L. Young, Stratford, Conn., assignors, by mesne assignments, to Dresser Industries, Inc., Dallas, Tex., a corporation of Delaware
Filed July 18, 1963, Ser. No. 296,026
5 Claims. (Cl. 73—418)

This invention relates to pressure responsive devices and more particularly to novel improvements in such devices of the Bourdon tube type in which the tube is fabricated from a relatively small diameter tube.

There has been an increasing demand for pressure responsive instruments, such as gauges, for the measurement of pressures in the range of 30,000 to 100,000 p.s.i. One construction of a gauge for supplying this need involves the use of what has been referred to as a spiralled Bourdon tube. While the more conventional Bourdon tube gauges utilize a generally C-shaped Bourdon tube, there have also been provided gauges such as shown in Patent No. 1,385,133 in which the tube had a generally spiral configuration. Such gauges normally are fabricated of relatively small diameter tubing, for example, on the order of .250". Attendantly, the wall thickness of such tubes is relatively small as compared to a conventional C-shaped Bourdon tube design, particularly in view of the high pressures considered.

When utilizing the relatively thick walled large C-shaped Bourdon tube, the connection of the tube to a source of pressure does not, at present, provide any particular problems. It is a common practice, for example, to insert the tube into what is referred to as a socket and then weld the socket and tube to form a unitary assembly. The external supply of pressure is then connected to the tube by means of a screwed connection to the socket. In attempting to weld a small diameter tube to such socket, it will be apparent that the physical characteristics of the tube may be changed in a manner whereby the tube may be critically weakened so that it will not withstand the pressures for which it is intended for use. While other means of providing external connections to a small-diameter tube have been suggested, such as in Patents 2,181,730 and 2,656,723, these approaches have for the most part been undesirably complicated and expensive.

Accordingly, it is the primary object of the present invention to provide novel and improved means for mounting the open end of a small diameter Bourdon tube and for connecting this end of the tube to an external tubing leading to a source of pressure. Included within this object is the object of providing such mounting means which will completely eliminate welding or other methods of assembly which would reduce the structural integrity of the tube or overall assembly.

It is another object of the invention to provide such means for mounting and connecting a Bourdon tube which will facilitate the final system connection by the user and which will enable the user to perform this operation without utilizing special parts or tools.

Other objects will be in part obvious, and in part pointed out more in detail hereinafter.

The invention accordingly consists in the features of construction, combination of elements and arrangement of parts which will be exemplified in the construction hereafter set forth and the scope of the application of which will be indicated in the appended claims.

In the drawing, the single figure is a front elevational view of a pressure gauge incorporating the present invention with the gauge being shown partly in section and with portions of the gauge being removed or cut away to reveal internal elements.

With reference to the drawing, an exemplary instrument with which the present invention is concerned is illustrated as a pressure gauge comprising a casing 10 within which is contained a spiral Bourdon tube 12. As shown in the drawing, one end of the tube is provided with a plurality of spirals terminating in a closed end 14. The tip or end 14 of the tube mounts a connecting member or bracket 16 which is suitably secured to the tip 14 of the tube so as to be movable therewith. The outer end of the bracket 16 is pivotally connected to one end of a link 18, the other end of which is pivotally connected to a gear segment and slide assembly 20 of a construction and operation which will be readily apparent to those skilled in the art. The slide and gear segment assembly 20 forms a part of a gauge movement assembly generally indicated at 22 which is supported, in normally fixed relation to casing 10, in a manner and for a purpose well known to those skilled in the art. The toothed portion 24 of the gear segment assembly meshes with a pinion mounted for movement with a pointer shaft 26 whereby movement of the free tip of the tube 12 will cause corresponding movement of the shaft 26. The shaft 26 will mount a pointer (not shown) which cooperates with a dial (not shown) fixed to the casing to provide an indication of the pressure of the fluid within the Bourdon tube 12.

The gauge also includes a socket member 28 which is suitably fixed relative to the casing. A portion of the socket is disposed within the casing and the lower end of the socket extends outwardly through the casing. The socket is provided with a central throughbore 30 which extends concentrically of the longitudinal axis of the socket. As shown in the drawing, the end portion of the Bourdon tube opposite the tip 14 extends from the spiral portion of the tube and is received within the throughbore in the socket. In order to fix the tube relative to the socket, the terminal end portion of the tube opposite the tip 14 is externally threaded and is threadably engaged with a correspondingly threaded portion adjacent the lower end of the throughbore 28 of the socket. Further, the socket is provided with a reduced diameter collar portion 32 at its upper end, which collar portion is crimped after the tube has been assembled in the socket in order firmly to lock the tube in place and preclude relative movement between the portion of the tube at the upper end of the socket and the socket itself.

It will thus be seen that there has been provided a rigid mounting of the supply pressure end of the Bourdon tube whereby the tube may not move relatively to the remainder of the gauge, except, of course, as regards the pressure responsive movement of the tip of the tube. In this manner, the tube is rigidly supported within the casing, even though the tube has not as yet been connected to external tubing for the supply of pressure to the gauge. Therefore, the gauge may be shipped and handled without fear that relative movement between the Bourdon tube and casing will cause damage to the tube or other elements connecting the tube to the pointer.

In order to provide a connection of the Bourdon tube to an external tubing leading to a source of pressure, the terminal fixed end of the Bourdon tube is provided with an internal conical surface or seat 34 having an inclination of preferably a 60° included angle. This inclined portion or seat at the end of the tube terminates in an enlarged diameter portion or counter bore of the throughbore 30 of the socket. The enlarged diameter portion of the throughbore is internally threaded so as to receive externally a threaded cylindrical member or adaptor sleeve 36 which is provided with a throughbore 38 adapted to receive one end of external tubing 40 leading to the pressure source. The end of the tubing 40 terminates in an external tapered seat which mates with the tapered seat 34 of the bourdon tube 12. These mating surfaces are held in engagement by an internally threaded sleeve 42 threadably engaged with the end of the tube 40. The outer cylindrical surface of the sleeve 42 is telescopically received within the counterbore of the throughbore 38 of the cylindrical member 36 with the end of the sleeve 42 opposite the Bourdon tube 12 being seated on a shoulder 44 formed in the cylindrical member 36. The cylindrical member 36 and sleeve 42 form a fairly well known tube connection whereby the threads of the sleeve 42 and cylindrical member 36 of the opposite hand and whereby inward threading of the member 36 into the socket 28 will firmly seat the ends of the tubes 12 and 40 in fluid tight relation. Also it will be observed that in accordance with the present invention, this means of connecting the supply tube 40 with the Bourdon tube 12 assures that the pressure fluid within the supply tube does not contact the socket but rather communicates directly with the interior of the Bourdon tube 12.

It will thus be seen that there has been provided novel and improved means for mounting and connecting the fixed end of a spiral Bourdon tube to an external pressure fluid supply tube, with such means being of particular utility where the tube is of relatively small diameter, say on the order of .250″, and has a relatively small wall thickness, for example, on the order of .050″. It should be noted that the connection between the tube and socket is the only means for mounting and supporting the tube on the casing and that tube is directly connected to the supply tubing without need for any intermediate connection. As noted above, the mounting of the Bourdon tube as taught by this invention provides a particularly rigid mounting firmly supporting the Bourdon tube without need for recourse to other means of supporting the tube, either before or after it is connected to the supply tubing. As has also been noted, the pressure fluid will not contact any portion of the gauge except the interior of the Bourdon tube, thus avoiding any adverse effects on the socket as might be caused by incompatibility between the socket material and the pressure fluid. The mounting of the Bourdon tube and its connection to the supply tubing is accomplished without the necessity of any welding, thereby elminating any undesired changes in physical properties of the Bourdon tube as might be caused by welding.

Inasmuch as many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language in the following claims is intended to cover all of the generic and specific features of the invention herein described and all statements of the scope of the invention which, as a matter of language, might be said to fall therebetween.

We claim:

1. In a pressure responsive instrument of the type incorporating a relatively small diameter deformable tube adapted to receive pressure fluid and having a movable and a fixed end; means mounting said fixed end of the tube comprising a fixed socket member having a throughbore receiving the fixed end of said tube, the fixed end portion of said tube being externally threaded, a portion of said throughbore of said socket being threaded and being threadably engaged with the threaded portion of said tube, said socket member being provided with a deformable collar-like portion at the end thereof opposite the fixed end of said tube, said collar portion clampingly engaging the tube to fix the tube relative to the socket at the portion thereof where the tube enters the socket, said throughbore being provided with a counterbore at one end of which the fixed end of the tube terminates, said fixed end of the tube further being provided with a conical seat adapted to mate in fluid sealed relation with a complementally shaped end portion of tubing carrying pressure fluid.

2. In a pressure responsive instrument of the type including an enclosing casing and a relatively small diameter deformable pressure responsive tube disposed in part within said casing and having a movable end within the casing and a fixed end; means mounting said fixed end of the tube on the casing comprising a socket member fixed to the casing with one end disposed within the casing and with its other end extending outwardly thereof, the socket being provided with a throughbore receiving the fixed end of said tube, said throughbore being provided with a counterbore at the external end of said socket at which the fixed end of the tube terminates, said tube being threadably engaged with said socket adjacent the terminus of the fixed end of the tube, said socket further being provided with a collar portion at the end thereof disposed within the casing, said collar portion clampingly engaging the tube to fix the same relative to the socket at the point the tube enters the socket, the cooperating engagement between said tube and socket providing the sole means for supporting the tube on the casing, said fixed end of the tube having a tapered conical seat adapted to mate in fluid sealed relation with a complementally shaped end portion of tubing carrying pressure fluid.

3. In combination: a pressure responsive instrument of the type having a deformable tubular element which is adapted to receive pressure fluid and which has a movable end and a fixed end and which is characterized by means mounting said fixed end of said tubular member comprising a fixed socket member having a throughbore receiving the fixed end of said tubular element, cooperating means on said socket member and tubular element fixing the tubular element relative to and supporting the tubular element on said socket member, said throughbore being provided with a counterbore at one end at which the fixed end of the tubular element terminates, said fixed end being provided with a seating surface; and a second tubular element having a seating surface shaped complementally to and engageable in fluid sealed relation with the seating surface on said fixed end; the wall of said counterbore being threaded, a generally cylindrical member disposed telescopically over said second tubular element and being threadably engaged with the wall of said counterbore, a sleeve threadably engaged with and over the end of said second tubular element adjacent said seating surface, said sleeve being received within a counterbore in said cylindrical member and being engaged with shoulder means on said cylindrical member whereby threading of said cylindrical member inwardly of said socket will effect seating of said complementally shaped surfaces.

4. In combination: a pressure responsive instrument of the type incorporating a relatively small diameter deformable tube adapted to receive pressure fluid and having a movable and a fixed end and which is characterized by means mounting said fixed end of the tube comprising a fixed socket member having a throughbore receiving the fixed end of said tube, the fixed end portion of said tube being externally threaded, a portion of said throughbore of said socket being threaded and being threadably engaged with the threaded portion of said tube, said socket member being provided with a deformable collar-like portion at the end thereof opposite the fixed end of said tube, said collar portion clampingly engaging the tube to fix the tube relative to the socket at the portion thereof where the tube enters the socket, said throughbore being provided with a counterbore at one end of which the fixed end of the tube terminates, said fixed end of the tube further being provided with a conical seat; and a second tube having a seating surface shaped complementally to and engageable in fluid sealed relation with the seat on the fixed end of the first tube; the wall of said counterbore being threaded, a generally cylindrical member disposed telescopically over said second tube and being threadably engaged with the wall of said counterbore, a sleeve threadably engaged with and over the end of said second tube adjacent said seating surface, said sleeve being received within a counterbore in said cylindrical member and being engaged with an internal shoulder formed by said counterbore in a cylindrical member whereby threading of said cylindrical member inwardly of said socket will effect seating of said complementally shaped surfaces.

5. In combination: a pressure responsive instrument of the type including an enclosing casing and a relatively small diameter deformable pressure responsive tube disposed in part within said casing and having a movable end within the casing and a fixed end; means mounting said fixed end of the tube on the casing comprising a socket member fixed to the casing with one end disposed within the casing and with its other end extending outwardly thereof, the socket being provided with a throughbore receiving the fixed end of said tube, said throughbore being provided with a counterbore at the external end of said socket at which the fixed end of the tube terminates, said tube being threadably engaged with said socket adjacent the terminus of the fixed end of the tube, said socket further being provided with a collar portion at the end thereof disposed within the casing, said collar portion clampingly engaging the tube to fix the same relative to the socket at the point the tube enters the socket, the cooperating engagement between said tube and socket providing the sole means for supporting the tube on the casing, said fixed end of the tube terminating in a tapered conical seat; and a second tube having a seating surface shaped complementally to and engageable in fluid sealed relation with the seat on the fixed end of the first tube; the wall of said counterbore being threaded, a generally cylindrical member disposed telescopically over said second tube and being threadably engaged with the wall of said counterbore, a sleeve threadably engaged with and over the end of said second tube adjacent said seating surface, said sleeve being received within a counterbore in said cylindrical member and being engaged with an internal shoulder formed by said counterbore in a cylindrical member whereby threading of said cylindrical member inwardly of said socket will effect seating of said complementally shaped surfaces.

References Cited by the Examiner

UNITED STATES PATENTS

| | | | |
|---|---|---|---|
| 429,067 | 5/1890 | Simmons | 285—177 X |
| 432,248 | 7/1890 | Rinman | 285—177 |
| 2,181,730 | 11/1939 | Heise | 285—61 |
| 2,284,260 | 5/1942 | Castellanos | 29—428 |

LOUIS R. PRINCE, *Primary Examiner.*

DAVID SCHONBERG, *Examiner.*

D. O. WOODIEL, *Assistant Examiner.*